UNITED STATES PATENT OFFICE.

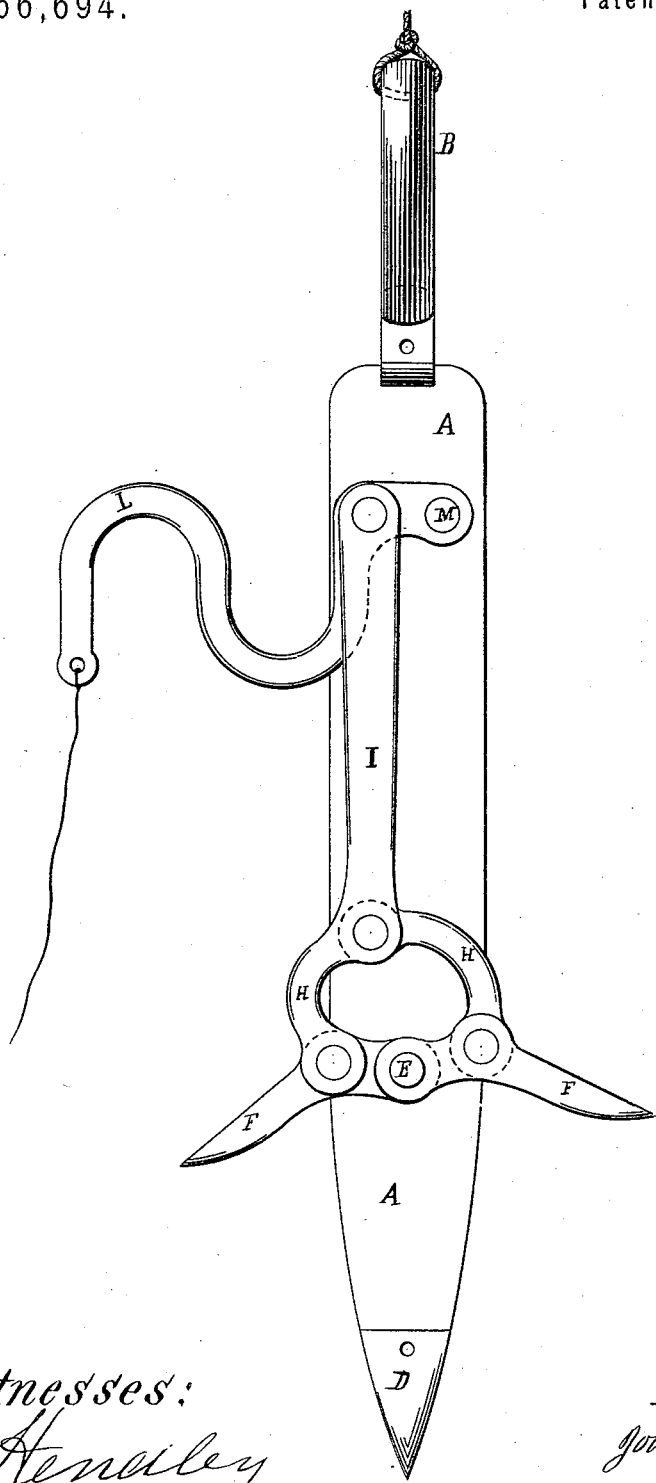

JOHN P. FRIEST, OF CHILLICOTHE, MISSOURI.

IMPROVEMENT IN HORSE HAY-FORKS.

Specification forming part of Letters Patent No. 166,694, dated August 17, 1875; application filed December 8, 1874.

*To all whom it may concern:*

Be it known that I, JOHN P. FRIEST, of Chillicothe, Missouri, have invented certain new and useful Improvements in Harpoon Horse Hay-Forks, of which the following is a specification, reference being had to the accompanying drawings.

The invention relates to an improved horse hay-fork of the kind commonly known as harpoon hay-forks; and consists in the mechanisms arranged in the manner hereinafter specified.

The object of the invention is to provide an effective implement for loading or unloading hay or analogous material.

A in the accompanying drawing is an open case, provided at one end with the ring B, and at the other with the point D, the sides of the case being thereabout reduced to conform with the sides of the point. At a suitable place above the point D is placed the pivot E, secured to the sides of the case, and serving as a pivot for the base of the teeth F, of the shape shown in the drawing. About one-third of their length from the pivot E the teeth F are pivoted to the ends of concave arms H, which are pivoted together above the pivot E, one of them being provided with the draw-rod I, the upper end of which is pivoted near the base of the serpentine lever L, which vibrates upon the pivot M below the ring B, through which one curve of the lever L passes when it is elevated. The lever L is of the shape shown in the drawing, this being the best adapted for the purpose of folding the device compactly for shipping. A cord or chain is attached to the free end of the lever, which, in operation, passes through the ring B on the side opposite the lever.

By arranging the lever so that it can pass through the ring B, as stated, the danger of breaking it is lessened.

It is obvious that great leverage-power is obtained in the above device, from the fact that a lever is employed at every point of tension.

The operation is the same as with other harpoon hay-forks.

What I claim as my invention, and desire to secure by Letters Patent, is—

The serpentine lever L, arranged to enter the case A and ring B, substantially as set forth.

In testimony that I claim the foregoing improvements in harpoon horse hay-forks, as above described, I have hereunto set my hand and seal this 6th day of November, 1874.

JOHN P. FRIEST. [L. S.]

Witnesses:
   A. N. SMITH,
   JOHN R. DAVIS, Jr.